(12) United States Patent  
Tang et al.

(10) Patent No.: US 8,743,503 B1
(45) Date of Patent: Jun. 3, 2014

(54) DISK DRIVE UPDATING COMPENSATION VALUES FOR MULTIPLE SERVO SECTORS BASED ON PES GENERATED FOR CURRENT SERVO SECTOR

(71) Applicant: Western Digital Technologies, Inc., Irvine, CA (US)

(72) Inventors: Shan Tang, Irvine, CA (US); Hengchang Guo, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/794,263

(22) Filed: Mar. 11, 2013

(51) Int. Cl.
G11B 5/596 (2006.01)

(52) U.S. Cl.
USPC .................................................. 360/77.04

(58) Field of Classification Search
CPC ........... G11B 5/59627; G11B 5/59672; G11B 5/5534; G11B 5/59677; G11B 5/59688; G11B 5/59694
USPC .............. 360/75, 77.04, 48, 77.08, 76, 77.02, 360/78.04, 31; 369/44.27, 44.28
See application file for complete search history.

(56) References Cited

U.S. PATENT DOCUMENTS

| | | |
|---|---|---|
| 5,949,605 A | 9/1999 | Lee et al. |
| 6,069,764 A | 5/2000 | Morris et al. |
| 6,141,175 A | 10/2000 | Nazarian et al. |
| 6,310,742 B1 | 10/2001 | Nazarian et al. |
| 6,437,936 B1 | 8/2002 | Chen et al. |
| 6,449,116 B2 | 9/2002 | Morris et al. |
| 6,519,108 B2 | 2/2003 | Au et al. |
| 6,549,362 B1 | 4/2003 | Melrose et al. |
| 6,556,371 B1 | 4/2003 | Ottesen et al. |
| 6,563,663 B1 | 5/2003 | Bi et al. |
| 6,587,302 B2 | 7/2003 | Ahn |
| 6,650,499 B1 | 11/2003 | Kusumoto |
| 6,678,108 B2 | 1/2004 | Smith et al. |
| 6,826,006 B1 | 11/2004 | Melkote et al. |
| 6,898,047 B2 | 5/2005 | Shishida et al. |
| 6,924,959 B1 | 8/2005 | Melkote et al. |
| 6,937,420 B1 | 8/2005 | McNab et al. |
| 6,937,424 B2 | 8/2005 | Chang et al. |
| 6,975,480 B1 | 12/2005 | Codilian et al. |
| 6,999,267 B1 | 2/2006 | Melkote et al. |
| 7,046,477 B2 | 5/2006 | Shibata |
| 7,088,547 B1 | 8/2006 | Wang et al. |
| 7,106,547 B1 | 9/2006 | Hargarten et al. |

(Continued)

OTHER PUBLICATIONS

U.S. Appl. No. 60/782,909, filed Mar. 15, 2006, 5 pages.

*Primary Examiner* — Nabil Hindi (57) ABSTRACT

A disk drive is disclosed comprising a head actuated over a disk comprising a plurality of servo tracks defined by servo sectors. The head is positioned over a first servo track, and a first position error signal (PES) by reading a first servo sector during a first revolution of the disk and in response to a first compensation value. A second compensation value is updated for a second servo sector based on the first PES during the first revolution of the disk. A second PES is generated by reading the second servo sector during the first revolution of the disk and in response to the updated second compensation value. The first compensation value is updated for the first servo sector based on the second PES during the first revolution of the disk. The head is actuated over the disk in response to the first PES and the second PES.

26 Claims, 4 Drawing Sheets

(56) References Cited

U.S. PATENT DOCUMENTS

| | | |
|---|---|---|
| 7,139,149 B1 | 11/2006 | Sun et al. |
| 7,196,864 B1 | 3/2007 | Yi et al. |
| 7,304,819 B1 | 12/2007 | Melkote et al. |
| 7,423,834 B1 | 9/2008 | Sun et al. |
| 7,450,336 B1 | 11/2008 | Wang et al. |
| 7,576,941 B1 | 8/2009 | Chen et al. |
| 7,583,470 B1 | 9/2009 | Chen et al. |
| 7,764,459 B2 | 7/2010 | Cho |
| 7,894,156 B2 | 2/2011 | Ehrlich et al. |
| 7,940,487 B1 * | 5/2011 | Krishnan et al. ............ 360/59 |
| 2003/0123180 A1 | 7/2003 | Settje et al. |
| 2004/0246619 A1 | 12/2004 | Zhang |
| 2007/0297088 A1 | 12/2007 | Sun et al. |

* cited by examiner

FIG. 3B $$\begin{bmatrix} w_0 \\ w_1 \\ \vdots \\ w_{M-1} \end{bmatrix} \mathrel{+}= \alpha(i) \cdot PES(i) \begin{bmatrix} g(\mod(M-i, M)) \\ g(\mod(M-i+1, M)) \\ \vdots \\ g(\mod(M-i-1, M)) \end{bmatrix}$$

DISK DRIVE UPDATING COMPENSATION VALUES FOR MULTIPLE SERVO SECTORS BASED ON PES GENERATED FOR CURRENT SERVO SECTOR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
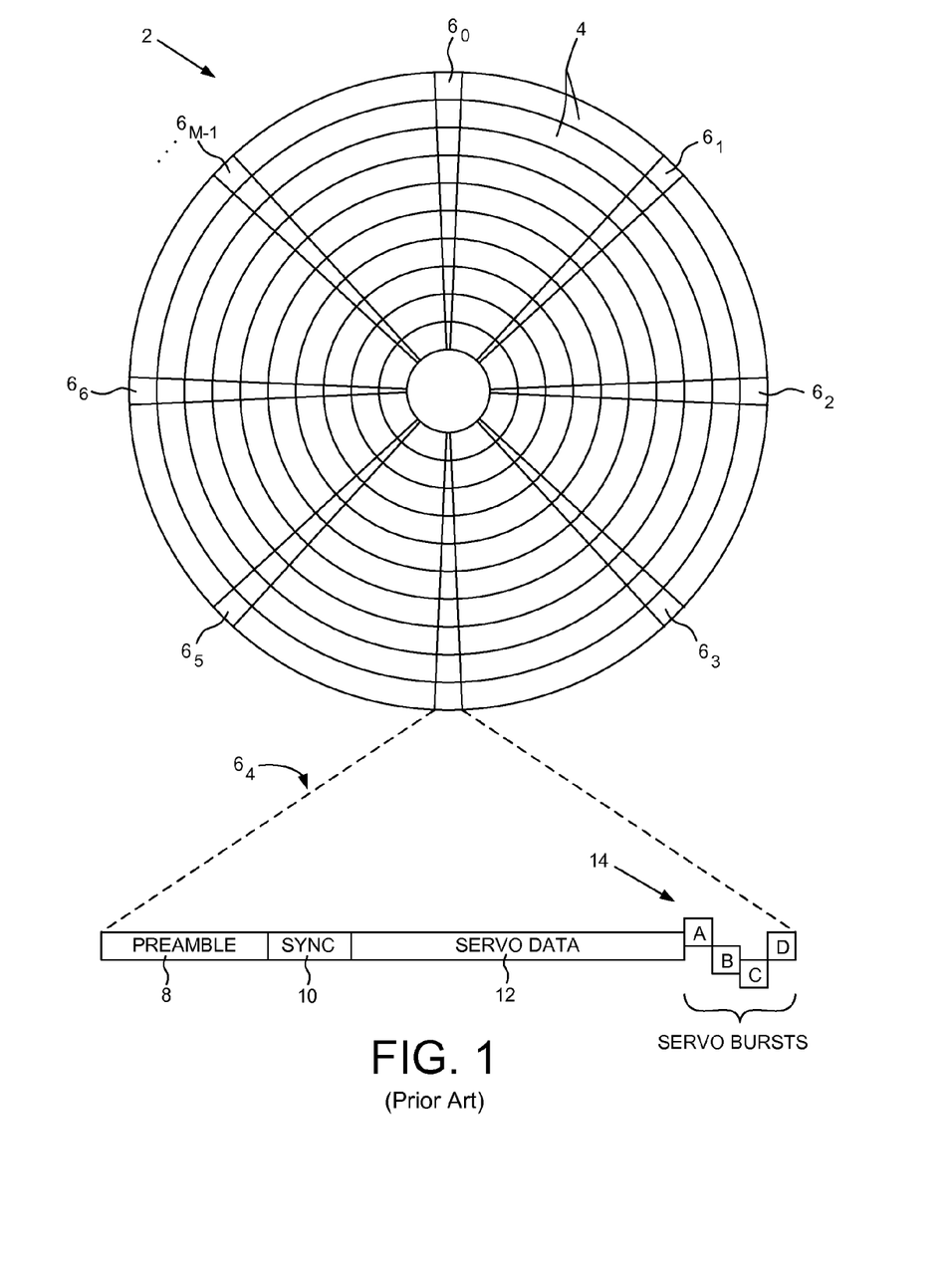
FIG. 1 shows a prior art disk format comprising a plurality of servo tracks defined by servo sectors.

FIG. 1 shows a prior art disk format comprising a number of servo sectors $6_0$-$6_{M-1}$ recorded around the circumference of the disk 2 that define a plurality of servo tracks 4, wherein data tracks are defined relative to the servo tracks (at the same or different radial density). Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

While the disk drive is centerline tracking a data track during write/read operations, there may be repeatable disturbances induced in the servo control system, such as a repeatable runout (RRO) due to an eccentricity of the servo tracks. There may also be a repeatable disturbance due to a "written-in error" of the servo sectors. The RRO and "written-in error" may be considered fixed disturbances that remain substantially constant over the life of the disk drive. There may also be a variable repeatable disturbance affecting the servo control system due, for example, to degradation of the spindle motor over the life of the disk drive, or changes in the operating environment such as external vibrations affecting the disk drive. When the disturbance is repeatable, compensation values may be learned and then applied to the servo control system as each servo sector is processed, thereby reducing the undesirable effect of the repeatable disturbance.

DETAILED DESCRIPTION

Figure 2A:
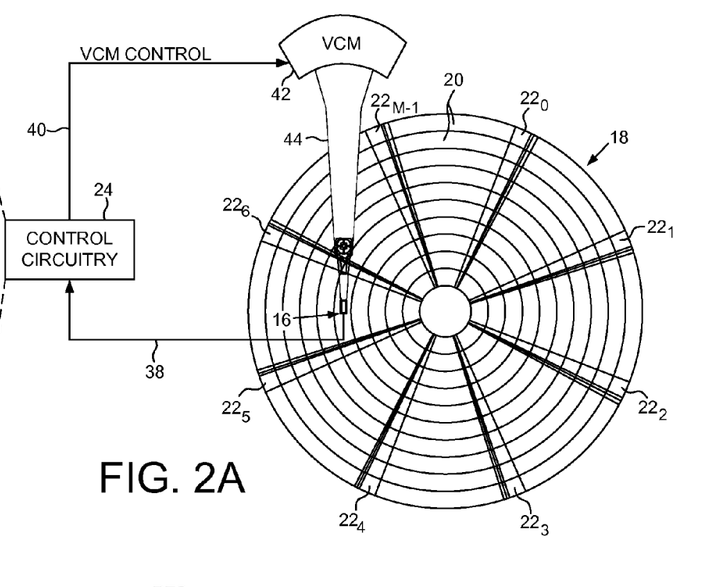
FIG. 2A shows a disk drive according to an embodiment comprising a head actuated over a disk.
Figure 2B:
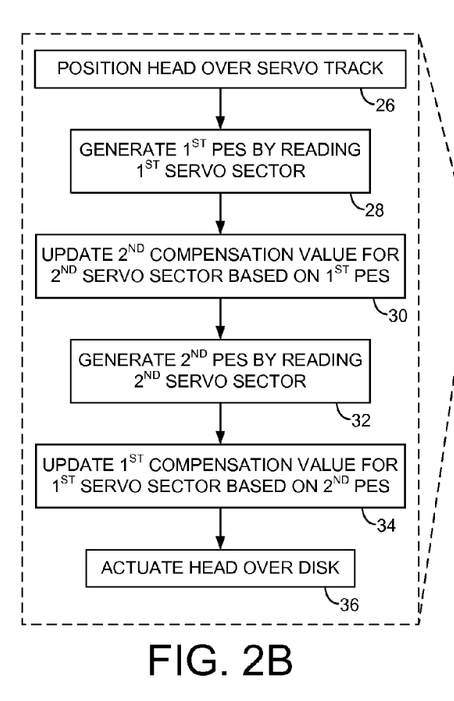
FIG. 2B is a flow diagram according to an embodiment wherein a PES generated after reading a first servo sector is used to update a compensation value for a second servo sector during a revolution of the disk.

FIG. 2A shows a disk drive according to an embodiment comprising a head 16 actuated over a disk 18 comprising a plurality of servo tracks 20, wherein each servo track comprises a plurality of servo sectors $22_0$-$22_{M-1}$. The disk drive further comprises control circuitry 24 operable to execute the flow diagram of FIG. 2B, wherein the head is positioned over a first servo track (block 26) and a first position error signal (PES) is generated by reading a first servo sector during a first revolution of the disk and in response to a first compensation value (block 28). A second compensation value for a second servo sector is updated based on the first PES during the first revolution of the disk (block 30), and a second PES is generated by reading the second servo sector during the first revolution of the disk and in response to the updated second compensation value (block 32). The first compensation value for the first servo sector is updated based on the second PES during the first revolution of the disk (block 34). The head is actuated over the disk in response to the first PES and the second PES (block 36).

In the embodiment of FIG. 2A, a read signal 38 emanating from the head 16 is processed by the control circuitry 24 to demodulate each servo sector $22_i$ into an estimated radial position of the head 16. The estimated radial position is processed by a servo control system that generates a control signal 40 applied to a voice coil motor 42 which rotates an actuator arm 44 about a pivot in order to actuate the head 16 radially over the disk 18. In other embodiments, the servo control system may generate a control signal applied to a suitable microactuator (e.g., a piezoelectric actuator) operable to actuate a suspension relative to the actuator arm 44, or operable to actuate the head 16 relative to the suspension, in fine movements while the VCM 42 actuates the head in coarse movements. The flow diagram of FIG. 2B may be executed for the VCM servo control loop and/or for the microactuator servo control loop. In either case, the servo control system generates compensation values that compensate for a repeatable disturbance due, for example, to a "written-in" error of the servo sectors $22_0$-$22_{M-1}$ or a repeatable runout (RRO) due to an eccentricity of the servo tracks 20.

Figure 2C:
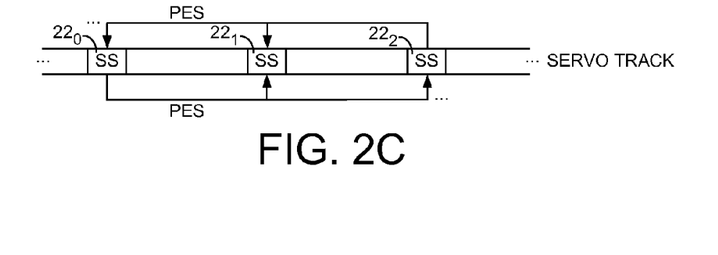
FIG. 2C shows an embodiment wherein the PES generated after reading a servo sector is used to update a compensation value for multiple other servo sectors during a revolution of the disk.

FIG. 2C illustrates an embodiment wherein after generating a PES for a first servo sector $22_0$, the PES is used to update the compensation values for servo sector $22_1$, $22_2$, etc. When the head reaches servo sector $22_2$, the PES generated for that servo sector is used to update the compensation values for servo sectors $22_1$, $22_0$, etc. In one embodiment, when a PES is generated for a current servo sector, the PES is used to update the compensation values for all other servo sectors, as well as the current servo sector, within the time it takes the head to reach the next servo sector. In this manner, all of the compensation values for each servo sector may be continuously updated during each revolution of the disk and as each servo sector is read.

In one embodiment, the compensation values are learned for each servo track during a calibration procedure, for example, after servo writing each disk surface. After learning the compensation values for a current servo track, the compensation values may be written after each servo sector as illustrated in FIG. 2A. During normal operation while the disk drive is deployed in the field, the compensation values are read when reading each servo sector, and the compensation values are used to compensate for the repeatable disturbance.

In an embodiment described below, the compensation values may be updated as the PES is generated for each servo sector until a stopping criterion has been met. A benefit of this embodiment is that the compensation values are generated and applied in the servo control system in real time so that when the stopping criterion has been met, the compensation values are immediately available for writing to the disk. Another benefit of this embodiment is that the compensation values are updated on a servo sector basis rather than on a revolution basis which means the stopping criterion may be met within a partial revolution of the disk while still updating all of the compensation values for each PES generated. In this manner, the time needed to learn the compensation values for each servo track is minimized, thereby significantly reducing the execution time of the manufacturing procedure.

In another embodiment, the compensation values that compensate for a repeatable disturbance may be computed on-the-fly during access operations of the disk drive. For example, after seeking the head to a target servo track the compensation values may be learned and/or updated on-the-fly as each servo sector is read prior to, or while accessing a data track. In one embodiment, updating the compensation values may improve the tracking performance when attempting retry operations for failed reads. That is, if a read operation fails while attempting to access a data track, updating the compensation values may improve the tracking performance of the servo control system during retry reads of the same data track.

In one embodiment, the compensation values may be used to cancel the repeatable disturbance from the measured position of the head (the PES) so that the head's trajectory is essentially unaffected by the repeatable disturbance. For example, when the repeatable disturbance comprises a repeatable runout (RRO), the fundamental and lower order harmonics of the RRO may be followed using feed-forward compensation, while the higher order harmonics may be canceled from the measured position of the head (the PES) so that the head's trajectory is unaffected by the higher order harmonics.

Figure 3A:
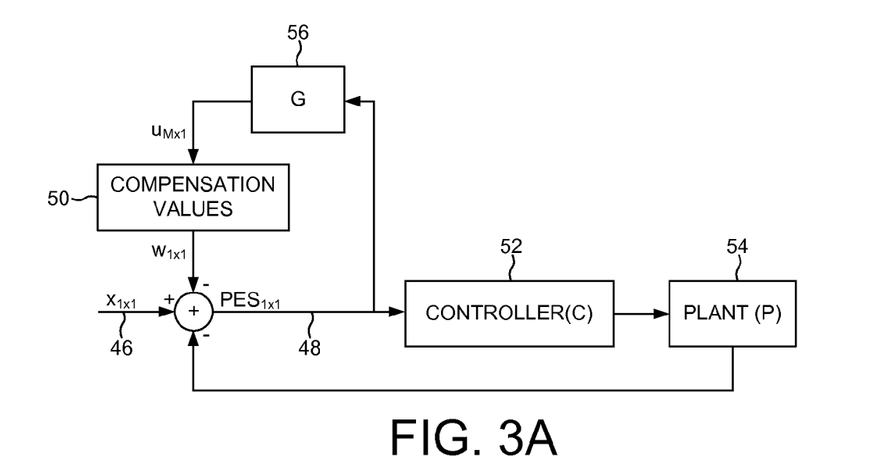
FIG. 3A shows a servo control system according to an embodiment wherein compensation values are generated based on the PES and an inverse error rejection curve.

FIG. 3A shows a servo control system according to an embodiment wherein a repeatable disturbance $x_{1 \times 1}$ 46 is canceled from the measured position of the head 48 (the PES) by subtracting compensation values 50 that compensate for the repeatable disturbance 46. In one embodiment, the repeatable disturbance 46 is learned while the head is tracking on a servo track, and therefore the desired measured position of the head 48 (the PES) is zero after canceling the effect of the repeatable disturbance 46. The effect of the repeatable disturbance on the measured position of the head 48 (the PES) is determined by the error rejection curve:

$$\frac{1}{1+CP}$$

where C represents a controller 52 and P represents the plant 54 (the head actuator). The compensation values 50 that will cancel the effect of the repeatable disturbance on the measured position of the head 48 may therefore be generated based on:

$$PES \cdot G$$

where G is the inverse of the error rejection curve. Accordingly, in the time domain the compensation values 50 may be generated by convolving the PES measurements with the impulse response of G 56. In an embodiment described below, a single term of each correlation in this convolution can be computed for the PES generated at each servo sector, and this single term of each correlation may be used to update the compensation value for all of the servo sectors. This is illustrated in FIG. 3A as a control vector $u_{M \times 1}$, representing the single term of each correlation in the convolution which is used to update each compensation value over the M servo sectors. A single compensation value $w_{1 \times 1}$ is then output corresponding to the current servo sector being read by the head.

Figure 3B:
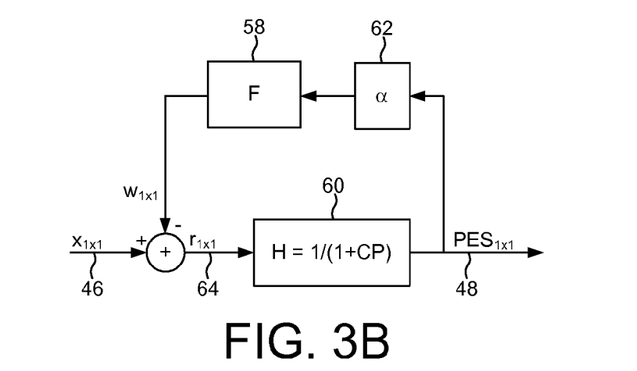
FIG. 3B shows a transformation of the servo control system according to an embodiment representing the output as the PES.

In one embodiment, the compensation values 50 may be adapted so as to cancel the effect of the disturbance 46 on the measured position of the head 48 (the PES) which is understood by transforming the servo control system of FIG. 3A into the simplified control system shown in FIG. 3B with the measured position of the head 48 (the PES) as the output. In FIG. 3B, F 58 represents G 56 combined with the compensation values 50, H 60 represents the error rejection curve, and a 62 represents a learning coefficient. The effect of the feedback loop in FIG. 3B will be to adapt the compensation values to match the disturbance $x_{1 \times 1}$ 46, thereby minimizing signal $r_{1 \times 1}$ 64. From the control system shown in FIG. 3B, it can be shown that:

$$\frac{R(z)}{X(z)} = \frac{1}{1+\alpha FH} = \frac{z^M - 1}{z^M - (1-\alpha)}$$

where the stability condition for the above equation is:

$$0 < \alpha < 2.$$

As described above, the time domain compensation value 50 for a particular servo sector may be generated by convolving the PES generated for all of the servo sectors in a revolution with the impulse response of G 56. Accordingly, when the head reaches servo sector i=0, the corresponding convolution term for updating the corresponding compensation value may be computed as:

$$w_0(kk+1) \mathrel{+}= \alpha \sum_i PES(i) \cdot g_j$$

where PES(i) represents the PES generated at each servo sector over the previous revolution of the disk, and $g_j$ represents the corresponding values of the impulse response of G 56. When the head reaches the next servo sector i=1, the corresponding convolution term for updating the corresponding compensation value may be computed as:

$$w_1(kk+1) \mathrel{+}= \alpha \sum_i PES(i) \cdot g_j$$

and so on for each servo sector. In one embodiment, instead of waiting to collect a full revolution of the PES for all of the servo sectors in order to update the compensation value for a single servo sector as described above, the single term in the correlation for all servo sectors is computed for all the servo sectors as each PES is generated for each servo sector. This single term in each correlation may then be used to update the corresponding compensation values for each servo sector (i.e., a single term in the above correlation summation is used to update each compensation value).

Figure 3C:
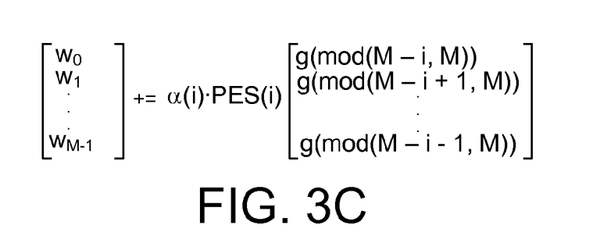
FIG. 3C shows an equation for updating the compensation values of all the servo sectors based on a PES generated for a single servo sector.

The above process for updating the compensation values as each PES is generated for each servo sector is represented mathematically in the equation of FIG. 3C. For example, the compensation value $w_o$ for servo sector i=a is updated according to:

$$w_0 += \alpha(a) \cdot PES(a) \cdot g(\mod(M-a,M))$$

where g(mod(M−a,M)) represents the corresponding value of the impulse response of G 56. A similar update is applied to all of the compensation values for each of the servo sectors based on the PES generated for servo sector i=a and as computed according to the equation of FIG. 3C using the corresponding value of the impulse response of G 56. FIG. 3C also illustrates an embodiment wherein the learning coefficient α may be different for each servo sector (e.g., learning coefficient α(a) for servo sector i=a).

The equation of FIG. 3C illustrates how the compensation values $w_0$–$w_{M-1}$ may be updated continuously as the PES is generated for each servo sector. In one embodiment, the compensation values $w_0$–$w_{M-1}$ are initialized to zero and then adapted as described above over one or more revolutions of the disk until a suitable stopping criterion has been met. When a servo sector is read during a current revolution, the PES 48 (FIG. 3A) is generated based on the previously updated compensation value 50 (i.e., updated using the PES generated for the previous servo sector). The PES 48 generated for the current servo sector is then used to update the compensation value 50 for the current servo sector (as well as update the compensation values for all other servo sectors) as described above.

In one embodiment, updating the compensation values 50 based on FIG. 3C may continue by reading the servo sectors until a stopping criterion indicates that the compensation values 50 have sufficiently converged. In one embodiment, the stopping criterion may be met when the PES generated for all of the servo sectors in a revolution falls below a threshold. In another embodiment, the stopping criterion may be met when a variance of the PES falls below a threshold. In yet another embodiment, the stopping criterion may be met when both of the above conditions are met.

Figure 4:
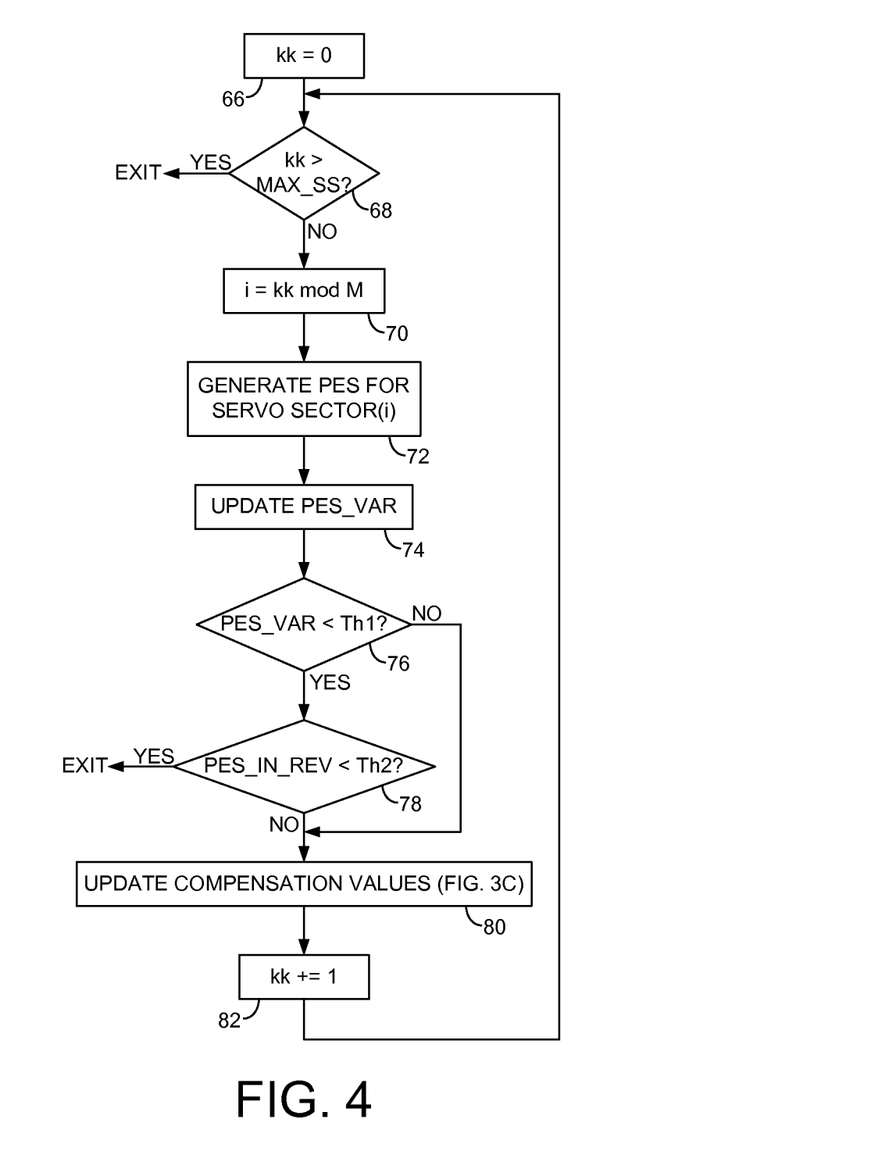
FIG. 4 is a flow diagram according to an embodiment wherein the compensation values are updated based on the PES of each servo sector until a stopping criterion is met.

FIG. 4 is a flow diagram illustrating this embodiment wherein a counter that tracks the number of servo sectors processed is initialized to zero (block 66). If the counter is less than a maximum (block 68), then a servo sector index is updated (block 70) and the PES is generated for the servo sector identified by the index (block 72). A variance for the PES (PES_VAR) is updated (block 74), and if the PES_VAR is less than a threshold (bock 76), a check is made to determine whether the PES generated over all of the servo sectors for the most recent revolution of the disk looking backward from the current servo sector fall below a threshold (block 78). If either condition at block 76 or block 78 is not met, then the compensation values are updated based on FIG. 3C (block 80). The counter is incremented (block 82) and the flow diagram is repeated starting from block 68 until both conditions at block 76 and block 78 are met (or until the counter reaches the maximum at block 68).

The variance of the PES (PES_VAR) may be updated in any suitable manner at block 74 of FIG. 4. In one embodiment, the PES_VAR is initialized to zero and then updated according to:

$$PES\_VAR += pes[i] \cdot pes[i] - PesSaved[i] \cdot PesSaved[i];$$

$$PesSaved[i] = pes[i].$$

In the above update equation, a PesSaved[ ] array saves the most recent PES generated for each servo sector. In one embodiment, the PesSaved[ ] array is initialized to zero so that PES_VAR will be generated initially by summing the square of the PES generated at each servo sector over the first revolution of the disk. The PES_VAR is then updated by adding the square of the current PES minus the square of the previous PES generated for each servo sector. As the compensation values converge, the PES will decrease causing the PES_VAR to decrease until it falls below the threshold at block 76.

Referring to block 78 of FIG. 4, any suitable technique may be employed to determine whether all of the PES generated for each servo sector over a current revolution of the disk looking backward from the current servo sector fall below a threshold. In one embodiment, the most recent M PES values generated over the most recent M servo sectors are saved in a first-in-first-out (FIFO) array. The condition at block 78 of FIG. 4 is then met if all of the PES values in the FIFO array fall below the threshold. In another embodiment, a flag may be maintained indicating whether all of the PES over a current revolution of the disk are less than the threshold. If the PES of a current servo sector exceeds the threshold, the flag is reset to false and the current servo sector becomes the starting point for the next revolution of the disk. The flag will be set to true if all of the subsequent PES fall below the threshold during the next revolution of the disk. If during the next revolution of the disk one of the PES exceeds the threshold, then the flag remains false and the tracking for the next revolution of the disk is reset.

In one embodiment, the flow diagram of FIG. 4 is executed for at least one full revolution of the disk. For example, in one embodiment the stopping condition at block 78 will not be met until the PES has been generated at least once for every servo sector over a first revolution of the disk. This embodiment ensures that the compensation values will have been initialized based on at least one full correlation of the above described convolution. After adapting the compensation values for the first full revolution of the disk, the stopping conditions of block 76 and block 78 may be met at any subsequent servo sector which may occur at a partial revolution of the disk. However, even when the stopping conditions are met at a partial revolution of the disk, the compensation values will have been updated using all of the PES generated up until reaching the stopping servo sector.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk comprising a plurality of servo tracks, wherein each servo track comprises a plurality of servo sectors;
a head; and
control circuitry operable to:
position the head over a first servo track;
generate a first position error signal (PES) by reading a first servo sector during a first revolution of the disk and in response to a first compensation value;
update a second compensation value for a second servo sector based on the first PES during the first revolution of the disk;
generate a second PES by reading the second servo sector during the first revolution of the disk and in response to the updated second compensation value;
update the first compensation value for the first servo sector based on the second PES during the first revolution of the disk;
actuate the head over the disk in response to the first PES and the second PES.

2. The disk drive as recited in claim 1, wherein the control circuitry is further operable to:

update the first compensation value for the first servo sector based on the first PES during the first revolution of the disk; and
update the second compensation value for the second servo sector based on the second PES during the first revolution of the disk.

3. The disk drive as recited in claim 1, wherein the control circuitry is further operable to:
update a third compensation value for a third servo sector based on the first PES and the second PES during the first revolution of the disk;
generate a third PES for the third servo sector during the first revolution of the disk and in response to the third compensation value; and
actuate the head radially over the disk in response to the third PES during the first revolution of the disk.

4. The disk drive as recited in claim 3, wherein the first, second, and third compensation values compensate for a repeatable disturbance when actuating the head.

5. The disk drive as recited in claim 1, wherein the control circuitry is operable to update multiple compensation values for multiple of the servo sectors based on the first PES according to:

$$\begin{bmatrix} w_0 \\ w_1 \\ \vdots \\ w_{M-1} \end{bmatrix} \mathrel{+}= \alpha \cdot PES(a) \begin{bmatrix} g(\mod(M-a, M)) \\ g(\mod(M-a+1, M)) \\ \vdots \\ g(\mod(M-a-1, M)) \end{bmatrix}$$

where:
$w_0$-$w_{M-1}$ represent the multiple compensation values for the multiple servo sectors;
a represents the first servo sector;
PES(a) represents the first PES;
$\alpha$ is a learning coefficient;
g(x) represents an inverse error rejection function.

6. The disk drive as recited in claim 5, wherein the control circuitry is operable to update multiple compensation values for multiple of the servo sectors based on the second PES according to:

$$\begin{bmatrix} w_0 \\ w_1 \\ \vdots \\ w_{M-1} \end{bmatrix} \mathrel{+}= \alpha \cdot PES(b) \begin{bmatrix} g(\mod(M-b, M)) \\ g(\mod(M-b+1, M)) \\ \vdots \\ g(\mod(M-b-1, M)) \end{bmatrix}$$

where:
$w_0$-$w_{M-1}$ represent the multiple compensation values for the multiple servo sectors;
b represents the second servo sector;
PES(b) represents the second PES;
$\alpha$ is a learning coefficient;
g(x) represents an inverse error rejection function.

7. The disk drive as recited in claim 6, wherein the control circuitry is further operable to update the multiple compensation values $w_0$-$w_{M-1}$ after reading each of the multiple servo sectors based on the PES generated for each of the multiple servo sectors according to:

$$\begin{bmatrix} w_0 \\ w_1 \\ \vdots \\ w_{M-1} \end{bmatrix} += \alpha \cdot PES(i) \begin{bmatrix} g(\mathrm{mod}(M-i, M)) \\ g(\mathrm{mod}(M-i+1, M)) \\ \vdots \\ g(\mathrm{mod}(M-i-1, M)) \end{bmatrix}$$

where i represents each of the multiple servo sectors.

8. The disk drive as recited in claim 6, wherein the control circuitry is further operable to update the multiple compensation values $w_0$-$w_{M-1}$ after reading each of the multiple servo sectors based on the PES generated for each of the multiple servo sectors during the first revolution of the disk.

9. The disk drive as recited in claim 5, wherein the control circuitry is further operable to update the multiple compensation values $w_0$-$w_{M-1}$ after reading each of the multiple servo sectors based on the PES generated for each of the multiple servo sectors during a second revolution of the disk.

10. The disk drive as recited in claim 5, wherein the learning coefficient $\alpha$ is greater than zero and less than two.

11. The disk drive as recited in claim 6, wherein the learning coefficient $\alpha$ for the first PES is different than the learning coefficient $\alpha$ for the second PES.

12. The disk drive as recited in claim 7, wherein the control circuitry is further operable to update the multiple compensation values $w_0$-$w_{M-1}$ until all of the PESs generated over a revolution of the disk are less than a threshold.

13. The disk drive as recited in claim 7, wherein the control circuitry is further operable to update the multiple compensation values $w_0$-$w_{M-1}$ until a variance of the PESs falls below a threshold.

14. A method of operating a disk drive comprising a head actuated over a disk comprising a plurality of servo tracks, wherein each servo track comprises a plurality of servo sectors, the method comprising:
    positioning the head over a first servo track;
    generating a first position error signal (PES) by reading a first servo sector during a first revolution of the disk and in response to a first compensation value;
    updating a second compensation value for a second servo sector based on the first PES during the first revolution of the disk;
    generating a second PES by reading the second servo sector during the first revolution of the disk and in response to the updated second compensation value;
    updating the first compensation value for the first servo sector based on the second PES during the first revolution of the disk;
    actuating the head over the disk in response to the first PES and the second PES.

15. The method as recited in claim 14, further comprising:
    updating the first compensation value for the first servo sector based on the first PES during the first revolution of the disk; and
    updating the second compensation value for the second servo sector based on the second PES during the first revolution of the disk.

16. The method as recited in claim 14, further comprising:
    updating a third compensation value for a third servo sector based on the first PES and the second PES during the first revolution of the disk;
    generating a third PES for the third servo sector during the first revolution of the disk and in response to the third compensation value; and
    actuating the head radially over the disk in response to the third PES during the first revolution of the disk.

17. The method as recited in claim 16, wherein the first, second, and third compensation values compensate for a repeatable disturbance when actuating the head.

18. The method as recited in claim 14, further comprising updating multiple compensation values for multiple of the servo sectors based on the first PES according to:

$$\begin{bmatrix} w_0 \\ w_1 \\ \vdots \\ w_{M-1} \end{bmatrix} += \alpha \cdot PES(a) \begin{bmatrix} g(\mathrm{mod}(M-a, M)) \\ g(\mathrm{mod}(M-a+1, M)) \\ \vdots \\ g(\mathrm{mod}(M-a-1, M)) \end{bmatrix}$$

where:
  $w_0$-$w_{M-1}$ represent the multiple compensation values for the multiple servo sectors;
  a represents the first servo sector;
  PES(a) represents the first PES;
  $\alpha$ is a learning coefficient;
  g(x) represents an inverse error rejection function.

19. The method as recited in claim 18, further comprising updating multiple compensation values for multiple of the servo sectors based on the second PES according to:

$$\begin{bmatrix} w_0 \\ w_1 \\ \vdots \\ w_{M-1} \end{bmatrix} += \alpha \cdot PES(b) \begin{bmatrix} g(\mathrm{mod}(M-b, M)) \\ g(\mathrm{mod}(M-b+1, M)) \\ \vdots \\ g(\mathrm{mod}(M-b-1, M)) \end{bmatrix}$$

where:
  $w_0$-$w_{M-1}$ represent the multiple compensation values for the multiple servo sectors;
  b represents the second servo sector;
  PES(b) represents the second PES;
  $\alpha$ is a learning coefficient;
  g(x) represents an inverse error rejection function.

20. The method as recited in claim 19, further comprising updating the multiple compensation values $w_0$-$w_{M-1}$ after reading each of the multiple servo sectors based on the PES generated for each of the multiple servo sectors according to:

$$\begin{bmatrix} w_0 \\ w_1 \\ \vdots \\ w_{M-1} \end{bmatrix} += \alpha \cdot PES(i) \begin{bmatrix} g(\mathrm{mod}(M-i, M)) \\ g(\mathrm{mod}(M-i+1, M)) \\ \vdots \\ g(\mathrm{mod}(M-i-1, M)) \end{bmatrix}$$

where i represents each of the multiple servo sectors.

21. The method as recited in claim 19, further comprising updating the multiple compensation values $w_0$-$w_{M-1}$ after reading each of the multiple servo sectors based on the PES generated for each of the multiple servo sectors during the first revolution of the disk.

22. The method as recited in claim 18, further comprising updating the multiple compensation values $w_0$-$w_{M-1}$ after reading each of the multiple servo sectors based on the PES generated for each of the multiple servo sectors during a second revolution of the disk.

23. The method as recited in claim 18, wherein the learning coefficient $\alpha$ is greater than zero and less than two.

24. The method as recited in claim 19, wherein the learning coefficient $\alpha$ for the first PES is different than the learning coefficient $\alpha$ for the second PES.

25. The method as recited in claim 20, further comprising updating the multiple compensation values $w_0$-$w_{M-1}$ until all of the PESs generated over a revolution of the disk are less than a threshold.

26. The method as recited in claim 20, further comprising updating the multiple compensation values $w_0$-$w_{M-1}$ until a variance of the PESs falls below a threshold.

\* \* \* \* \*